US011410091B2

(12) United States Patent
Renganathan et al.

(10) Patent No.: US 11,410,091 B2
(45) Date of Patent: Aug. 9, 2022

(54) ENHANCED VIRTUAL EXPERIENCE SERVICE FOR GUEST-FACING CRUISE SHIP APPLICATIONS AND SYSTEMS

(71) Applicant: Royal Caribbean Cruises Ltd., Miami, FL (US)

(72) Inventors: Srinivasan Renganathan, Parkland, FL (US); Ricardo Martinez, Pembroke Pines, FL (US); Srini Nambiar, Pembroke Pines, FL (US)

(73) Assignee: Royal Caribbean Cruises Ltd., Miami, FL (US)

( * ) Notice: Subject to any disclaimer, the term of this patent is extended or adjusted under 35 U.S.C. 154(b) by 0 days.

(21) Appl. No.: 16/949,704

(22) Filed: Nov. 11, 2020

(65) Prior Publication Data
US 2022/0147881 A1 May 12, 2022

(51) Int. Cl.
*G06Q 10/02* (2012.01)
*G06T 19/00* (2011.01)
*G06Q 10/10* (2012.01)

(52) U.S. Cl.
CPC ........... *G06Q 10/02* (2013.01); *G06Q 10/109* (2013.01); *G06T 19/006* (2013.01)

(58) Field of Classification Search
CPC ..... G06Q 10/02; G06Q 10/109; G06T 19/006
See application file for complete search history.

(56) References Cited

U.S. PATENT DOCUMENTS

| | | | |
|---|---|---|---|
| 6,134,534 A | 10/2000 | Walker et al. | |
| 2002/0044203 A1* | 4/2002 | Sapir | G06F 3/011 340/541 |
| 2005/0228702 A1 | 10/2005 | Fairbanks et al. | |
| 2011/0288893 A1* | 11/2011 | Francis | G06Q 10/02 705/5 |
| 2018/0342106 A1* | 11/2018 | Rosado | G06Q 10/109 |

FOREIGN PATENT DOCUMENTS

JP 2016177424 A 10/2016

OTHER PUBLICATIONS

"Design Thinking and Virtual Reality in the Cruise Industry" by Juha Hollanti (Year: 2020).*
International Search Report and Written Opinion for International Application No. PCT/US2021/050038 dated Dec. 10, 2021, in 16 pages.

* cited by examiner

*Primary Examiner* — Zeina Elchanti
(74) *Attorney, Agent, or Firm* — Knobbe, Martens, Olson & Bear, LLP

(57) ABSTRACT

A virtual testing platform for a cruise ship is described. An example platform obtains information indicative of passengers of a sailing of a cruise ship, the information indicating assignment of the passengers to respective cabins of the cruise ship. A first subset of the passengers who represent virtual passengers and a second subset of the passengers who represent real-world passengers are determined, with the virtual passengers being indicated as not having arrived to board the cruise ship, such that the virtual passengers are not counted as being embarked on the cruise ship. Requests for activities received from applications are responded to, with the responses indicating whether the bookings were successful, and with each request being determined as being associated with a virtual passenger or a real-world passenger. The successful bookings associated with virtual passengers are triggered for cancellation.

21 Claims, 9 Drawing Sheets

ENHANCED VIRTUAL EXPERIENCE SERVICE FOR GUEST-FACING CRUISE SHIP APPLICATIONS AND SYSTEMS

BACKGROUND

Technological Field

The present application relates to systems and techniques for experiencing the features, such as testing the features, of software and applications. More specifically, this disclosure relates to simulating virtual information for guest experience testing.

Description of the Related Art

Cruise ships are often designed to provide substantial conveniences to thousands or more passengers, while ensuring that the passengers are entertained during lengthy sailings. For example, a cruise ship may provide a litany of activities including entertainment options, dining options, excursions, and so on. Due to the number of passengers, certain activities may require reservations by the passengers. As an example, a passenger may reserve a table for a particular live-comedy act which is being held on the cruise ship. As another example, a passenger may reserve time at an on-board computer to access the internet, email, and so on.

To reserve such activities, a cruise ship may provide software for passengers to utilize. For example, the passengers may obtain an application from an online application store for use on their mobile devices. In this example, the application may communicate with on-board systems which are located on the cruise ship. As an example, a mobile device may connect to a WiFi network of the cruise ship. Subsequently, the application may present available activities which a passenger can reserve. Any user input associated with reserving an activity may be provided via the WiFi network to one or more systems on the cruise ship. These systems may then effectuate the reservation.

Since the guest experience of a passenger on a cruise ship may depend largely on access to the above-described activities, it is paramount that such applications function correctly. However, at present there is an immense technical challenge associated with ensuring correct operation of a mobile application and associated on-board systems. For example, there may be hundreds or thousands of different legacy systems which collectively allow for reservations of different activities. These systems may be running different operating systems, may have different capabilities, may require different levels of interaction from employees to effectuate reservations, and so on. In this way, an employee or service provider associated with the cruise operator may be unable to ensure correct operation of the mobile application, which may negatively impact a guest experience of the passengers.

SUMMARY

The system, method, and devices of this disclosure each have several innovative aspects, no single one of which is solely responsible for its desirable attributes disclosed herein. Without limiting the scope of this disclosure, example embodiments will now be discussed briefly.

In a first aspect, a method for validating functionality of one or more ship-based systems managing operations associated with a cruise ship is described. The one or more ship-based systems are in communication with a plurality of user devices executing respective applications, the applications being controlled by passengers of the cruise ship and enabling activity by the passengers, the method comprising: by one or more processors, identifying, via an obtained manifest, passengers of a sailing of the cruise ship, the manifest indicating assignments of the passengers to respective cabins of the cruise ship; obtaining virtual deck information indicating that a first subset of the cabins represent virtual cabins of the cruise ship, wherein a second subset of the cabins represent physical cabins of the cruise ship; determining, based on the passengers identified via the manifest, a first subset of the passengers who represent virtual passengers and a second subset of the passengers who represent real-world passengers, the virtual passengers being assigned to the virtual cabins and the real-world passengers being assigned to the physical cabins, wherein the virtual passengers are indicated as not having arrived to board the cruise ship, such that the virtual passengers are not counted as being embarked on the cruise ship; and responding to requests for bookings received from applications executed by the plurality of user devices, wherein responses to the requests indicate whether the bookings were successful, wherein each request is determined as being associated with a virtual passenger or a real-world passenger, and wherein successful bookings associated with virtual passengers are triggered for cancellation.

In a second aspect, a system is described. The system comprises one or more processors and non-transitory computer storage media storing instructions that when executed by the one or more processors, cause the processors to perform operations comprising: obtaining information indicative of passengers of a sailing of a cruise ship, the information indicating assignment of the passengers to respective cabins of the cruise ship; determining, based on the obtained information, a first subset of the passengers who represent virtual passengers and a second subset of the passengers who represent real-world passengers, wherein the virtual passengers are indicated as not having arrived to board the cruise ship, such that the virtual passengers are not counted as being embarked on the cruise ship; and responding to requests for activities received from applications executed by a plurality of user devices, wherein responses to the requests indicate whether the bookings were successful, wherein each request is determined as being associated with a virtual passenger or a real-world passenger, and wherein successful bookings associated with virtual passengers are triggered for cancellation.

In a third aspect, non-transitory transitory computer storage media is described. The non-transitory computer storage media stores instructions that when executed by a system of one or more processors, cause the one or more processors to perform operations comprising: obtaining information indicative of passengers of a sailing of a cruise ship, the information indicating assignment of the passengers to respective cabins of the cruise ship; determining, based on the obtained information, a first subset of the passengers who represent virtual passengers and a second subset of the passengers who represent real-world passengers, wherein the virtual passengers are indicated as not having arrived to board the cruise ship, such that the virtual passengers are not counted as being embarked on the cruise ship; and responding to requests for activities received from applications executed by a plurality of user devices, wherein responses to the requests indicate whether the bookings were successful, wherein each request is determined as being associated with a virtual passenger or a real-world passenger, and wherein successful bookings associated with virtual passengers are triggered for cancellation.

BRIEF DESCRIPTION OF THE DRAWINGS

The disclosed aspects will hereinafter be described in conjunction with the appended drawings and appendices, provided to illustrate and not to limit the disclosed aspects, wherein like designations denote like elements.

DETAILED DESCRIPTION

Figure 1:
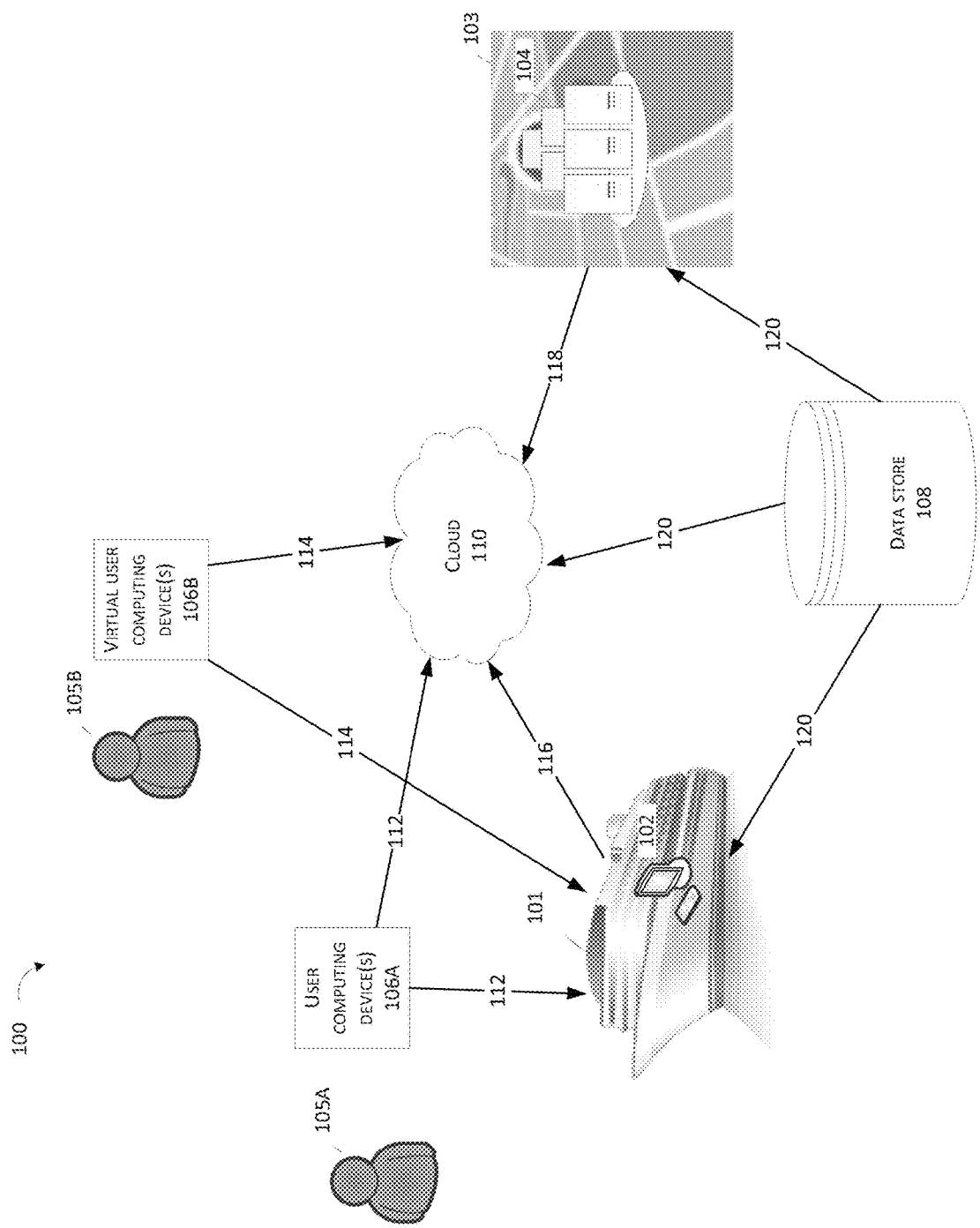
FIG. 1 is a block diagram illustrating an example networked computing system including a ship-based computing system communicating with a shore-based computing system.

This application describes enhanced techniques for testing of applications and systems associated with a cruise ship. Advantageously, the testing may be implemented during a sailing of a cruise ship, without negative impact on passengers' experience during the sailing of the cruise ship. As described herein, an application (e.g., a mobile application) may be used by passengers of the cruise ship to reserve activities throughout the lifecycle of a sailing. For example, the application may present different types of activities available on the sailing (e.g., dining, excursions, live shows). In this example, a passenger may select an activity and cause a reservation to be placed (e.g., the passenger may reserve a table at a restaurant). The application may then provide the reservation request to one or more on-board systems of the cruise ship. The application may therefore provide a succinct front-end user interface which masks the complexities associated with effectuating reservations by thousands or more passengers.

However, certain cruise ships may lack centralized servers to centrally manage all reservation and passenger functionality. Instead, these cruise ships may have a complex technological environment in which a large number of different legacy computing systems are used by service providers associated with the cruise operator (for example, employees of the cruise operator embarked on the cruise ship, hereinafter "employees"). For example, each restaurant may have different on-board computing systems used by employees of the restaurant. When a reservation for a specific restaurant is placed via the application, it may be routed to specific computing systems positioned proximate to the specific restaurant. In this way, employees of the restaurant may monitor availability, contact passengers, and so on. As another example, different computing systems may be used to manage reservations for excursions. Certain of these computing systems may additionally require manual entry by employees. For example, a passenger may request a reservation for an excursion. In this example, the request may be routed to a computing system. To effectuate the reservation, an employee may be required to manually enter the reservation details.

It may be appreciated that ensuring proper functionality of the application and associated on-board systems may present a great technological challenge. For example, it is advantageous to ensure that passengers are able to properly reserve activities, place purchases, view information via the application, and so on. However, without the techniques described herein an employee may be unable to use the application for testing purposes. For example, certain testing techniques may require the application to be taken temporarily off-line during a sailing. Employees may then perform testing of the application and associated functionality during this off-line period. While this off-line period may be at an off-hour, such as 2 am, it may still disadvantage users and the employees.

In contrast to the above, the techniques described herein may advantageously enable testing without affecting users' use of the application. For example, the application is not required to be taken off-line temporarily to troubleshoot for any errors. Instead, employees may perform rapid testing of the application in substantially real-time. This may allow the employees to diagnose issues in real-time without requiring prompting from users regarding any noticed errors.

The application described herein may only allow use by users who represent validated passengers of the cruise ship. Each of the validated passengers may be assigned to a respective cabin on a respective deck of the cruise ship. Thus, access to the application may be constrained to passengers with assigned passenger-cabins on the cruise ship. Governmental regulations, such as safety and customs regulations, require that all passengers are counted in a manifest required by governmental entities in order for passengers to embark and disembark. Additionally, governmental entities may require each validated passenger to be assigned to a specific muster station prior to the start of the sailing.

In this way, it may not be possible for the employee to merely access the application to test whether the application, such as reservation functionality, is correctly working. Since the application is only usable by passengers of the cruise ship, merely creating a new user account for the employee to test the application may cause creation of a profile for a new passenger. This may result in the manifest incorrectly double-counting the employee as being both an employee and a passenger of the cruise ship. Furthermore, the legacy systems described above may be unable to distinguish between reservations placed by passengers and reservations which are used for testing purposes. This may result in reservations being held for employees who are not actually showing up to a reserved activity, but rather merely ensuring proper operation of the application and associated systems.

To address at least these technological challenges unique to cruise ships, this application describes an enhanced virtual testing platform. As will be described, the virtual testing platform may allow for the simulation of passengers (herein referred to as "virtual passengers") and simulation of on-board decks (herein referred to as "virtual cabins" and "virtual decks"). In this way, employees may use accounts associated with these virtual passengers to test on-board reservation functionality (e.g., for the benefit of real-world passengers). Advantageously, the virtual testing platform may ensure that the virtual passengers are not counted in the legally-required manifest. In this way, double-counting of employees may be avoided. As another example, the virtual testing platform may ensure that all reservations placed by virtual passengers may be automatically canceled. The automated virtual testing platform of the present disclosure may therefore enhance a guest experience of the passengers by ensuring fast and reliable operation of reservation functionality.

Advantageously, the virtual testing platform may allow for testing of proper functioning of the application during a sailing of a cruise ship. For example, employees may repeatedly test the application and associated functionality during the sailing. As described above, this testing may be performed simultaneously with actual use by end-users (e.g., real-world passengers). Thus, any issues or errors revealed during the testing may be rapidly addressed to improve the passenger experience during the sailing, rather than after the sailing ends.

With respect to mustering, it may be appreciated that with the techniques described herein the crew of a cruise ship will not be looking in vain for virtual passengers. Advantageously, these virtual passengers may be assigned to mustering stations with virtual decks. Additionally, these virtual passengers will be marked as being "no-shows." For example, a system may automatically indicate that they have not shown up. Thus, all real-world passengers may be accounted for during a required mustering. Due to the seriousness of mustering, it would not be feasible to implement a testing scheme in which there was any possibility of mustering being impacted. Thus, the techniques described herein address technical problems specific to cruise ships and improve upon prior techniques for testing applications in real-time.

Reference below is made to actions performed by virtual passengers. It may be appreciated that such actions may be performed by persons (e.g., employees) who are using accounts with an application associated with virtual passengers. Additionally, reference below is made to actions performed by real-world passengers. Similarly, it may be appreciated that such actions may be performed by persons (e.g., passengers) who are using associated accounts with the application. For example, a passenger may be required to log-into the application via a user name and password. As another example, a passenger may be required to log into the application via identifying information, biometric information, challenge responses, and so on.

While this application describes employees performing testing, it may be appreciated that in some embodiments an automated software tool may perform testing. For example, a software agent may periodically execute a multitude of tests which cause reservations to be placed, products to be purchased, and so on. In this example, the software agent may utilize an account associated with a virtual passenger as described herein.

Although embodiments of the virtual testing platform described herein are described in the context of enhancing performance of guest-facing applications used by customers of a cruise operator, it will be understood that the present technology is not limited to this class of customer, this type of service provider, or the particular cruise context. Features of the present technology can be employed in many other contexts, such as but not limited to entertainment, hotel, and other hospitality services and systems; banking and other financial services and systems; healthcare services and systems; and health information technology (HIT) services and systems. For example, in one non-limiting implementation, a virtual testing platform of the present disclosure can allow testing of a patient-facing application that receives requests from accounts associated with real-world patients and accounts associated with virtual patients; determines when requests are associated with a virtual patient by, for example, determining that the virtual patient has been assigned a virtual hospital bed or a virtual hospital room on a virtual floor of a real-world hospital; and ensures that products and services with limited inventory are not reserved or booked by virtual patients. The present disclosure can be implemented in any system where it is desirable to test a software application used by real-world users by simulating virtual users that are assigned to a virtual location (e.g., virtual hotel room, virtual hotel floor, virtual hospital room, virtual hospital floor, virtual ship cabin, virtual ship deck), and testing real-world transactions initiated by the virtual user using the software application.

Introduction—Virtual Testing Platform

As described above, a cruise ship may provide various software applications or other platforms which with passengers can engage in order to enhance their experience during a scheduled voyage of the cruise ship (hereinafter "sailing"). These various software applications or other platforms may allow a passenger to receive information, make requests, reserve activities, and so on. However, the passengers may encounter various issues or problems when engaging with the various software applications or other platforms that may require monitoring or management of the various software applications or other platforms. For example, an application may present an error when a passenger requests a reservation. As another example, the application may incorrectly indicate a successful reservation. Thus, when a passenger shows up to his/her reserved activity, the activity may be fully booked or employees may be unaware of the reservation. These errors may detract from a guest experience of the passengers.

Advantageously, this disclosure describes a virtual testing platform usable by employees of a cruise ship. The virtual testing platform may allow for employees to use the same application as on-board passengers for testing purposes. For example, employees may access the application with virtual passenger accounts that simulate virtual passengers on the cruise ship. In this example, virtual passengers can review shipboard products, services, activities and so on, which are offered on the ship during a particular sailing, as well as shore-based products offered in ports where the ship is scheduled to visit. Virtual passengers can additionally review, choose, reserve, and book the shipboard products, services, experiences, and so on, that are offered during a particular sailing. In this way, employees may ensure proper functionality of the application via these virtual passengers.

Furthermore, the virtual testing platform may address technological challenges specific to cruise operators. As may be appreciated, cruise operators may collect and store information for each passenger who has purchased a cruise experience. For example, the information may include booking information such as a cabin and deck which is assigned to each passenger. As another example, the information may include customer IDs, credit card information, and so on. Prior to the start of sailing, a cruise operator may confirm that the identification information is accurate before authorizing the passenger to board a cruise ship. For example, the cruise operator may confirm that each passenger has an assigned cabin prior to boarding. Once a passenger is boarded, the cruise operator may update a legally-required manifest to indicate the presence of the passenger. Passengers confirmed in this way may be deemed "validated" passengers. Governmental entities may validate that the manifest is correct prior to allowing the cruise ship to depart or return to port. For example, a governmental entity may require a physical counting of all passengers on the cruise ship to validate the manifest. As another example, the governmental entity may ensure that each passenger assigned to a cabin is also assigned a muster station on the cruise ship.

Access to the application described above may be predicated on validated booking information of a passenger of the cruise ship. For example, the application may require that each passenger authenticate his or her identity via respective identifying information described above. The application may then be associated with the passenger, such as the passenger's credit card information, assigned cabin, assigned muster station, and so on. In this way, the passenger may use the application to view an identification of his/her cabin and muster station. The passenger may also use the application to place reservations for different activities available via the cruise ship.

Since the application may only be utilized by passengers with validated boarding information, and who therefore are assigned a specific cabin, there may be a one-to-one mapping of these validated passengers with the manifest. Therefore, an employee of the cruise ship may be unable to use the application for testing purposes. For example, the employee may create a "test" account in the application, which account would be required to have an associated passenger in the manifest with an assigned cabin, an assigned muster station, and so on. Thus, the employee may be counted twice in the manifest. For example, the employee and his/her test account would be separately included in the manifest. Due to this double counting of the employee in the ship's manifest, a governmental entity may deny departure or return of the cruise ship.

Advantageously, the virtual testing platform described herein may allow for virtual passengers to be simulated and associated with test accounts of the application in a way that avoids these challenges and also allows employees to detect and address issues with the application in real-time. As will be described, virtual passengers of a cruise ship may be created. Each virtual passenger may be associated with booking information similar to that of real-world passengers. Additionally, each virtual passenger may be assigned to a virtual cabin of the cruise ship. For example, virtual cabins (e.g., on virtual decks) may be associated with the cruise ship. The virtual cabins and virtual decks may not be associated with physical cabins and physical decks of the cruise ship and instead may represent a logical representation of decks and/or cabins.

These virtual passengers may be categorized as having not arrived to board the ship for purposes of the ship's manifest. However, since they have valid booking information, they may be assigned to respective virtual cabins in order to utilize the application and to make corresponding requests, reservations, and/or purchases. The virtual booking and/or the virtual cabin may be used to associate a virtual passenger with corresponding real-world requests, reservations, or purchases of the virtual passenger. In order to ensure that the virtual cabin is not made available to a physical real-world passenger, the virtual cabins and virtual decks may be blocked from the general inventory of the cruise ship. Therefore, physical decks and physical cabins may be made available to physical, real-world passengers for reservations, and the virtual decks and virtual cabins may be reserved for the virtual passengers.

Employees of the cruise ship may therefore use these virtual passengers to ensure proper functionality of the application. For example, the virtual testing platform may link one or more employees to a virtual passenger. The employees may log into the application via identifying information associated with the virtual passenger. As will be described, the virtual passenger may be capable of booking reservations, purchasing products, requesting information, or otherwise interacting with the cruise ship in the same manner as a real-world passenger of the cruise ship. As a result, the virtual passenger can allow an employee to test all aspects of the application functionality that the employee would be able to test if the employee were using the account of a real-world passenger to perform testing.

The virtual passengers may be designated by the virtual testing services and systems with special designations. These special designations can effectively designate the virtual passengers as being "no-shows" who did not board the cruise ship prior to the sailing of the cruise ship. This can prevent the virtual passengers from being added to the above-described manifest of passengers while retaining the ability for the virtual passengers to interact with the real-world activities offered on the cruise ship. By preventing the virtual passengers from being added to the manifest, the cruise operators are able to maintain an accurate manifest that reflects the current number of real-world passengers on a cruise ship without the inclusion of virtual passengers who do not reflect current real-world passengers on the cruise ship.

Thus, the virtual passengers and the real-world passengers may utilize the application to request reservations (herein also referred to as "bookings"). Computing systems on the cruise ship may approve and/or accept these requests. In this way, employees may use the virtual passengers to ensure that reservation functionality is operating correctly. As will be described, reservation requests which are provided by virtual passengers may be automatically discarded. In this way, reservations associated with virtual passengers may be removed such that limited resources (e.g., excursions with limited slots) are not occupied by virtual passengers. Furthermore, credit card transactions which are placed by virtual passengers may be automatically canceled during, or prior to completion of, the sailing.

As will be described, computing systems of the cruise ship may differentiate real-world passengers and virtual passengers based on one or more flags or identifiers associated with the virtual passengers. For example, virtual passengers may be assigned certain known names. As another example, the virtual cabins assigned to the virtual passengers may be on specific virtual decks which do not physically exist on the cruise ship.

Example Block Diagram

FIG. 1 is a block diagram illustrating an example networked computing system 100 including a ship-based computing system 102 communicating with a shore-based computing system 104. The ship-based computing system 102 may communicate with the shore-based computing system 104 via a cloud-based or wireless network 110, according to this exemplary embodiment. In some embodiments, the ship-based computing system 102 is located on a cruise ship 101 configured to transport passengers during a trip or voyage ("sailing"). The shore-based computing system 104 may be located in a shore-based facility 103 and may be associated with a service provider, such as cruise operator.

The shore-based computing system 104 may also include a cloud-based database or data store 108 with which the ship-based computing system 102 communicates at least periodically.

The system 100 includes user computing devices 106A-106B which are operated by real-world passengers and virtual passengers. Example computing devices may include smartphones, wearable devices, tablets, laptops, desktops, and so on. The user computing devices 106A-106B may allow real-world passengers 105A and virtual passengers 105B to respectively manage activities. For example, managing activities may include making reservations, canceling reservations, ordering meals, ordering upgrades, managing dining options, managing entertainment options, and so on. The activities may include experiences, items, activities, entertainment, dining, and events (collectively referred to as "products") while the real-world passengers 105A are on the ship 101 during the sailing.

As will be described in more detail below with reference to FIG. 2, the virtual passengers 105B may represent virtualized, or simulated, passengers of the ship 101. These virtual passengers 105B may be controlled by employees of the ship 101 and be utilized to test functionality of the application and system 100.

The computing devices 106A and 106B may be configured to execute an application associated with the ship 101. For example, the application may be a mobile application obtained from an online application store. The passengers 105A-105B may use the application to perform different activities. As an example, the application may be used to view the various products offered onboard the ship 101 as well as during port visits. Example products may include entertainment options, dining options, admission to on-ship events, and so on. The passengers 105A and 105B may request bookings of these different products, which may be associated with reservation requests.

The computing devices 106A and 106B may be in communication with the ship-based computing system 102 via a wireless or wired network. In some embodiments, the ship-based computing system 102 may represent a multitude of on-board computing systems. For example, a passenger may request a reservation at a dining option. In this example, a booking request may be routed via the wireless or wired network to one or more computing systems associated with the dining option.

When using the application, each of the passengers 105A-105B may be associated with identifying information. For example, each passenger may have an assigned cabin, an assigned deck, an assigned muster station, and so on. In this way, a dining reservation may be associated with a specific requesting passenger. Furthermore, each of the passengers 105A-105B may optionally be associated with additional information, such as credit card information.

With respect to credit card information, each of the products, shipboard events, shipboard experiences, and so on, may be associated with a cost. A passenger may be debited for the cost once selected via the application or upon completion of the sailing. It will be understood that shipboard events and experiences may also include events and experiences for which no cost is associated. Furthermore, shipboard events and experiences may also include events and experiences for which no reservation or booking is required for a customer to participate, for example, welcome parties, informational presentations for port calls, and walk-in dining experiences.

Some products may be offered and/or available for purchase or reservation at any time by the passengers 105A-105B, while some products may be offered and/or available at selected times and dates. For example, tickets for an excursion may optionally only be available for purchase up to 6 hours before the excursion. Furthermore, certain items or products may be offered for sale for limited items (e.g., an hour, two hours, and so on). Some products may be available in unlimited, or virtually unlimited quantities, while some products are available in limited quantities. As described in more detail below, for products having limited inventory or special restrictions, the ship-based computing system 102 can dynamically monitor such inventory levels and may prevent any subsequent requests or purchases of the product when the inventory level reaches a pre-determined number (e.g., 0, 1, or 2 products remain in inventory).

Due to the complexity of the products, reservations, and so on, which are available on the ship 101, the virtual passengers 105B may perform testing of the application and system 100. For example, a virtual passenger may use the application to select from among the different products. In this example, the virtual passenger may then cause purchasing of a specific product. Similar to a real-world passenger, the purchase may be effectuated by the system 100. To ensure proper functioning, an employee accessing the application via an account associated with the virtual passenger may then verify that the product was purchased. Optionally, an automated software tool may ensure that the product was purchased.

As another example, a virtual passenger may use the application to request a booking for an excursion. In this example, the application may route the request to one or more computing systems which implement such a booking request. An employee may similarly ensure correct operation of the application and system 100. For example, the employee may call another employee associated with the excursion to ensure a valid booking. As another example, a computing system used by employees of the excursion may execute software which indicates whether the booking was successful. In this example, the software may route a response to a user device of the virtual passenger via a wired connection. The response can include an indication that the booking request was successfully entered.

Since the above-described virtual passenger is capable of purchasing products and requesting bookings, the system may ensure that actions of the virtual passenger are canceled or discarded. For example, the system 100 may prevent any product requests or purchases by virtual passengers 105B from being counted against inventory levels. For example, if a virtual passenger purchases a spot on an excursion which is limited to fifteen passengers, the system 100 may prevent the virtual passenger from being assigned one of the fifteen spots. Techniques to cancel or discard actions of virtual passengers 105B are described in more detail below.

As illustrated in FIG. 1, a data store 108 may be used to store information associated with a sailing. For example, the data store 108 may store information associated with the passengers who have, or are scheduled to, embark on the sailing. Example information may include booking information, such as identifying information associated with each passenger. Booking information may also include which cabin on an associated deck of the ship 101 is assigned to each of the passengers.

The booking information may include information for the virtual passengers 105B. For example, booking information may be created which includes names associated with the virtual passengers 105B, virtual cabins assigned to the virtual passengers 105B, virtual mustering stations on virtual decks assigned to the virtual passengers 105B, credit or payment information associated with the virtual passengers 105B, and so on. However, the virtual passengers 105B may, in some embodiments, not be assigned to physical cabins of the ship 101. For example, these physical cabins may only be booked by and assigned to real-world passengers 105A. Thus, advantageously the virtual passengers 105B may be assigned to virtual cabins. These virtual cabins may not be present on the ship 101 (e.g., the numbers for these virtual cabins may not correspond to any real-world cabin).

In this way, the booking information for the virtual passengers 105B may appear to be valid for system 100. However, the virtual passengers 105B may be differentiated from the real-world passengers 105A based on the booking information. For example, specific names may be used for the virtual passengers 105B. As another example, the virtual passengers may be assigned to the virtual cabins and/or virtual decks which are not physically present on the ship 101. In this example, the virtual passengers 105B may be assigned to virtual decks which exceed a number of real-world decks of the ship 101. Thus, actions of these virtual passengers may be identified and discarded as described above.

Thus, the virtual passengers 105B may utilize the application described herein similar to that of real-world passengers 105A. Since these passengers 105B have associated booking information, they may therefore purchase real-world products, request real-world bookings, and so on. As may be appreciated, the disparate computing systems on the ship 101 may execute established, legacy, software. Thus, these computing systems may not lend themselves to testing without use of such virtual passengers 105B described herein. For example, these computing systems may optionally be tested without knowledge that they are effectuating activities of virtual passengers 105B. Instead, and as described above, the system 100 may cancel or discard these activities during the sailing or upon completion.

Since the virtual passengers 105B are associated with booking information, they may be reflected on a manifest of the ship 101. A ship's manifest may represent a listing of the cargo, passengers, and crew of a ship, for the use of customs and other officials. Since any passenger reflected on the manifest may be required to be physically counted and present on the ship 101 prior to the start of the sailing, the virtual passengers may be indicated as having not arrived at the ship 101 to embark. Thus, they may be marked as being "no-shows." In contrast, the real-world passengers 105A who have arrived to the ship 101 to embark on the cruise may be marked as being present in the manifest.

The data store 108 may additionally store information indicative of products purchased, booked, or reserved by passengers 105A-105B during the sailing. For example, products purchased by real-world passengers 105A may be reflected in the data store 108. In this example, the system 100 may effectuate payment from the real-world passengers 105A for these products. Similarly, products purchased by virtual passengers 105B may be reflected in the data store 108. In contrast to real-world passengers 105A, the system 100 may discard or cancel these purchases.

Since the ship 101 may not have access to the internet, or may have limited bandwidth such that processing of credit card information may be disfavored during the sailing, in some embodiments purchases may be processed upon completion of the sailing. As will be described below with reference to FIG. 3, activities performed by the virtual passengers 105B may be canceled or discarded upon completion of the sailing. In some embodiments, the activities may be canceled or discarded periodically during the sailing.

In some implementations, each sailing may result in new virtual passengers 105B. For example, the shore-based computing system 104 may cause updated booking information for the virtual passengers 105B to be included in the data store 108. In some other implementations, a subsequent sailing may reuse one or more virtual passengers. In this way, different virtual passengers 105B (e.g., different numbers, different identifying information) may be used to test the application and system 100.

Example Workflow for FIG. 1

Figure 2:
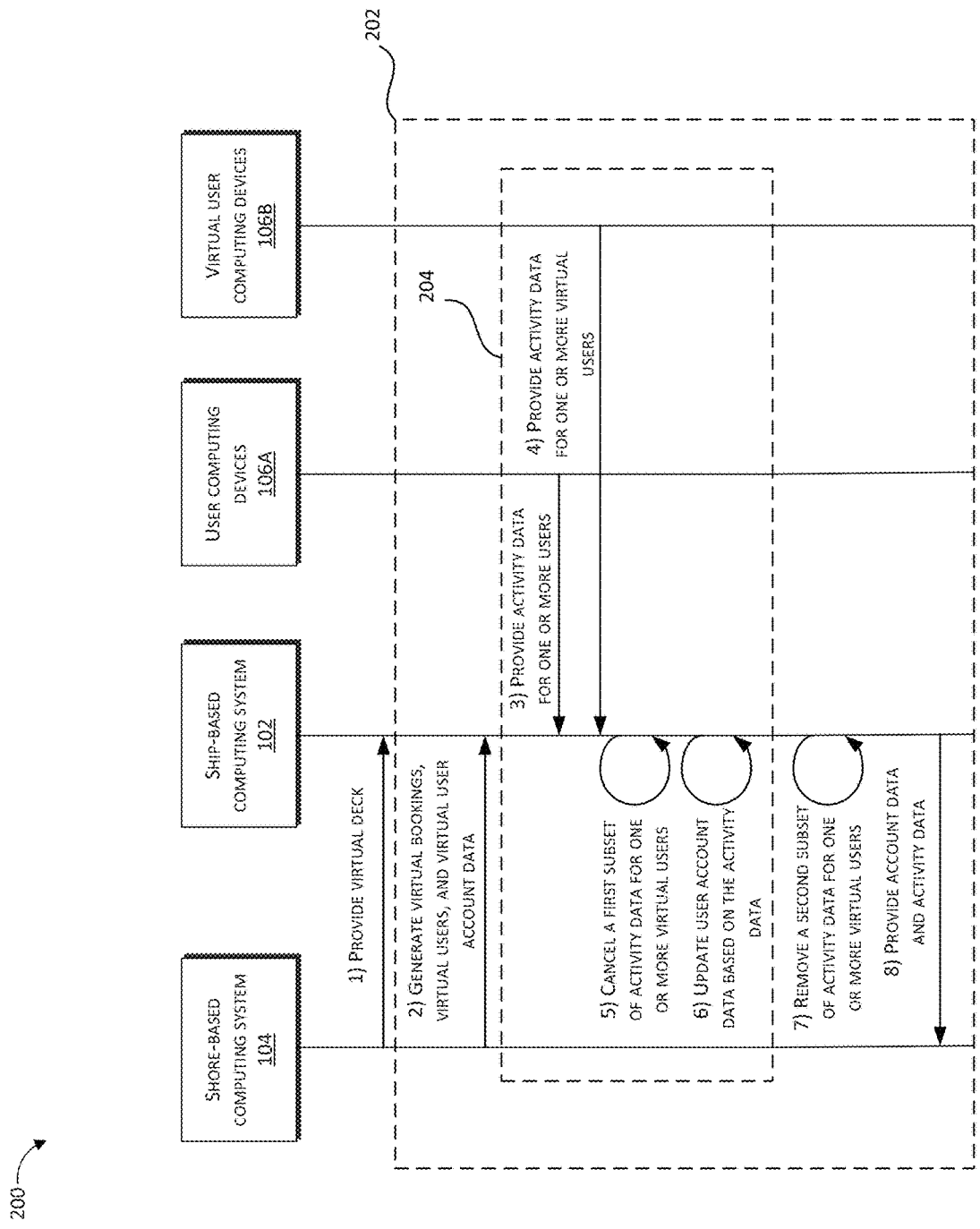
FIG. 2 illustrates an example workflow for managing a virtual testing environment within the example networked computing system.

FIG. 2 illustrates an example workflow for managing a virtual testing environment within the example networked computing system. Specifically, the illustrative interactions of FIG. 2 depict techniques to generate virtual booking information. FIG. 2 additionally depicts the virtual booking information to be managed by a system (e.g., the system 100).

The interactions of FIG. 2 begin at (1). The shore-based computing system 104 provides virtual deck information to the ship-based computing system 102. Virtual deck information may include, for example, a designation of a virtual deck of the ship 101. The virtual deck information may further include one or more virtual cabins. For example, the virtual deck may include a multitude of virtual cabins, with each virtual cabin accommodating one or more virtual passengers. The same virtual deck information may be provided to a ship of a fleet of ships. In other implementations, different virtual deck information may be provided to each ship of a fleet of ships. Furthermore, while one or more ships may be provided the same virtual deck, each of the one or more ships may be provided with different virtual cabins. For example, ships may have different numbers of virtual cabins or the virtual cabins may accommodate different numbers of virtual passengers.

Interaction (1) may occur, for example, during initialization of the virtual testing services or during commissioning of the ship. Optionally, the virtual deck information may be provided to the ship-based computing system 102 prior to each sailing of the ship 101. The ship-based computing system 102 may combine the virtual deck information with previously-obtained deck information associated with the ship. For example, the ship-based computing system 102 may receive a plurality of decks corresponding to general deck information prior to an initial embarkation. The ship-based computing system 102 may subsequently add the virtual deck information to the general deck information and store the general deck information into one or more data stores.

The remaining interactions of FIG. 2 may occur multiple times and are therefore shown in FIG. 2 as loop 202. Loop 202 may be implemented at each period of a given duration (e.g., every n days) during operation of the virtual testing service. For example, the loop 202 may be implemented at a duration corresponding to the duration of a sailing of the ship 101.

At (2), the shore-based computing system 104 may generate virtual booking information. As described above, virtual booking information may reflect accommodations for virtual passengers. For example, each virtual passenger may be assigned a name, a virtual cabin, a virtual deck, a virtual mustering station on the virtual deck, and so on.

As an example, names of two virtual passengers may be VirtualGuest #12134 and VirtualGuest #12135. These virtual passengers may be considered, in the virtual booking information, to "room" together in VirtualCabin #1. The virtual passenger account data may include information pertaining to the virtual passengers. This information may include information corresponding to the virtual passengers, such as a virtual dining time, a virtual credit card number, and so on. In some implementations, virtual bookings may limit one virtual passenger to a virtual cabin. In other implementations, virtual bookings may limit a threshold number of virtual passengers assigned to a virtual cabin or may require the threshold number of virtual passengers to be assigned to a virtual cabin.

The shore-based computing system 104 may provide the virtual booking information to the ship-based computing system 102. For example, the information may be provided prior to a sailing. The shore-based computing system 104 may be configured to update the virtual booking information prior to any subsequent sailing.

The interactions (3)-(6) of FIG. 2 may optionally occur multiple times and are therefore shown in FIG. 2 as loop 204. For example, loop 204 may be implemented once a day to clear the virtual passenger account activity. In another example, loop 204 may be implanted instantaneously and the virtual passenger account activity may be cleared as soon as it is received.

At (3), the real-world passenger computing devices 106A track activity of the real-world passengers 105A via the respective applications and provide the activity data to the ship-based computing system 102. For example, the activity may include reservations (e.g., herein also referred to as bookings), purchases, requests, and so on. Thus, the activity of the real-world passengers 105A may include reservations at dining establishments, purchases of drink passes, live-show bookings, and so on. The activity data may optionally be processed by the ship-based computing system 102. For example, if the activity of a real-world passenger includes a reservation at a dining establishment, the activity data provided via the application may include the time and the date of the reservation, the name of the dining establishment, the number of guests in the dining party, and so on.

As described above, in some embodiments the dining establishment reservation may be routed (e.g., via a system in communication with the real-world passenger computing devices 106A) to one or more computing systems positioned proximate to the dining establishment. In this way, the computing systems may cause the reservation to be held. In some embodiments, a central server system on the ship may update a database associated with reservations. In these embodiments, the one or more computing systems proximate to the dining establishment may view a representation of the database to identify upcoming reservations.

At (4), the virtual passengers computing devices 106B track activity of the virtual passengers 105B and provide activity data for one or more of the virtual passengers to the ship-based computing system 102. The activity of the virtual passengers 105B may similarly include real-world reservations, purchases, requests, bookings, and so on. The activity of the virtual passengers 105B may correspond to activity done for testing purposes. For example, a virtual passenger may conduct certain activity to ensure that the relevant processes and software is working properly. Further, a virtual passenger may conduct certain activity to track or manage an issue flagged by one or more real-world passengers. For example, a real-world passenger may be unable to place a reservation at a dining establishment and, in order to test the processes or software, a virtual passenger may place a reservation at the dining establishment.

At (5), the ship-based computing system 102 may cancel a first subset of the activity data for the virtual passengers 105B in order to prevent the activity data from consuming limited resources. Cancelling the first subset of activity data may occur subsequent to an approval of requests associated with the first subset of activity data. The ship-based computing system 102 may be configured to cancel activity data upon receiving the activity data from the virtual passenger computing devices 106B. In other implementations, the ship-based computing system 102 may be configured to cancel activity data at periodic time intervals (e.g., every minute, every hour, every day, and so on). The first subset of the activity data may correspond to activities with limited resources. For example, the first subset of the activity data may correspond to limited resources such as dining reservations, excursions, and so on, which are limited to a certain number of guests, in order to prevent virtual passengers from occupying spots that might otherwise be available for real-world passengers.

The ship-based computing system 102 may remove the first subset of activity data from one or more data stores storing data of the passengers. In some embodiments, the ship-based computing system 102 may remove a portion of the first subset of activity data that corresponds to limited resources (e.g., a booking for a limited excursion or dining experience) while retaining data or metadata associated with the activity of the one or more virtual passengers (e.g., the action taken by the virtual passengers). This may allow the ship-based computing system 102 to avoid limited spots from being taken up, while retaining data of the virtual passengers' 105B interactions with the system. The ship-based computing system 102 may further generate a response to the first subset of activity data indicating that the requests were approved and subsequently canceled.

The ship-based computing system 102 may identify activity data associated with the virtual passengers 105B based on one or more flags or indicia associated with the virtual passengers 105B. For example, the system 102 may identify a booking as corresponding to a virtual passenger based on a name associated with the booking. As another example, the system 102 may identify a booking as corresponding to a virtual passenger based on a cabin or deck assigned to a person associated with the booking. In this example, if the cabin or deck corresponds to a known virtual cabin or known virtual deck, then the booking may be identified as being associated with a virtual passenger.

At (6), the ship-based computing system 102 may update account data based on activity data for one or more real-world passengers 105A and one or more virtual passengers 105B in order to track activity data associated with each of the real-world passengers and each of the virtual passengers. The ship-based computing system 102 may be configured to update the account data upon receiving the activity data.

At (7), the ship-based computing system 102 may cancel (e.g., remove) a second subset of the activity data for one or more virtual passengers 105B in order to prevent the activity data from being transmitted to the shore-based computing system 104. The second subset of the activity data may include activity data for one or more virtual passengers 105B which was not previously canceled. For example, the first subset of activity data canceled at (5) and the second subset of activity canceled at (7) may include all activity data associated with the virtual passengers 105B.

In other embodiments, a subset of activity data associated with the one or more virtual passengers may not be canceled at (5) or at (7). The ship-based computing system 102 may be configured to cancel the second subset of activity data upon reaching a destination. For example, the ship-based computing system 102 may be configured to cancel the second subset of activity data upon the docking of the cruise ship at a port of call or upon the return of the cruise ship to its home part at the end of a sailing. In some embodiments, the ship-based computing system 102 may be configured to cancel the second subset of activity data prior to reaching a destination. For example, the ship-based computing system 102 may cancel the second subset of activity data three days, one day, 12 hours, one hour, or any other time period before reaching the destination. In other embodiments, the ship-based computing system 102 may be configured to cancel the second subset of activity data at periodic time intervals (e.g., as a cron job).

At (8), the ship-based computing system 102 may transmit the account data and the activity data to the shore-based computing system 104. The activity data may include activities associated with the real-world passengers. For example, the account data may be provided to the shore-based computing system 104 for further analysis such as determining a monetary amount owed by each passenger.

With respect to virtual passengers, the activity data may reflect activities associated with the virtual passengers. The activity data may also be used to determine the success rate, implementation rate, failure rate, or other statistics associated with testing. For example, the activity data may indicate whether any of the activities resulted in improper operation of the system 102 or application. As an example, if a virtual passenger was unable to place a reservation at a restaurant, the activity data may reflect this as a bug report.

Example User Interfaces

Figure 3A:
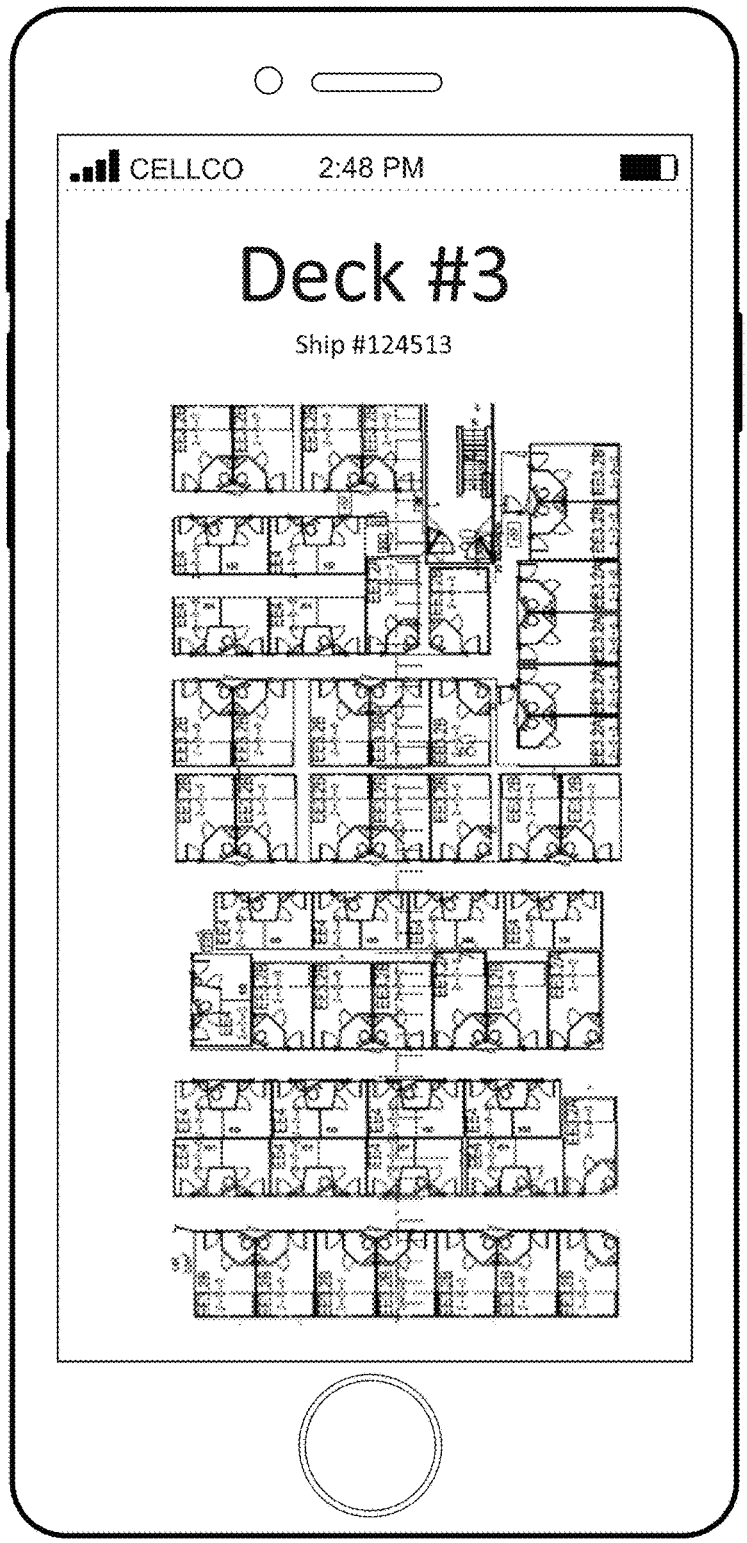
FIG. 3A illustrates an example user interface of an example arrangement of cabins corresponding to a deck of a cruise ship.

FIG. 3A illustrates an example of the application described herein. Specifically, the application is presenting a user interface for presentation via a user device 300A. In the illustrated embodiment, a graphical representation of a real-world deck of a cruise ship is presented. The graphical representation includes a top plan view of an example arrangement of real-world cabins on the deck.

In one non-limiting example, the user interface can be used by an employee to view real-world cabins located on a real-world passenger's assigned deck. For example, the user interface may represent an interactive map usable by the employee. In another non-limiting example, the user interface can be used by the real-world passenger to obtain information about real-world cabins located on a real-world deck.

Figure 3B:
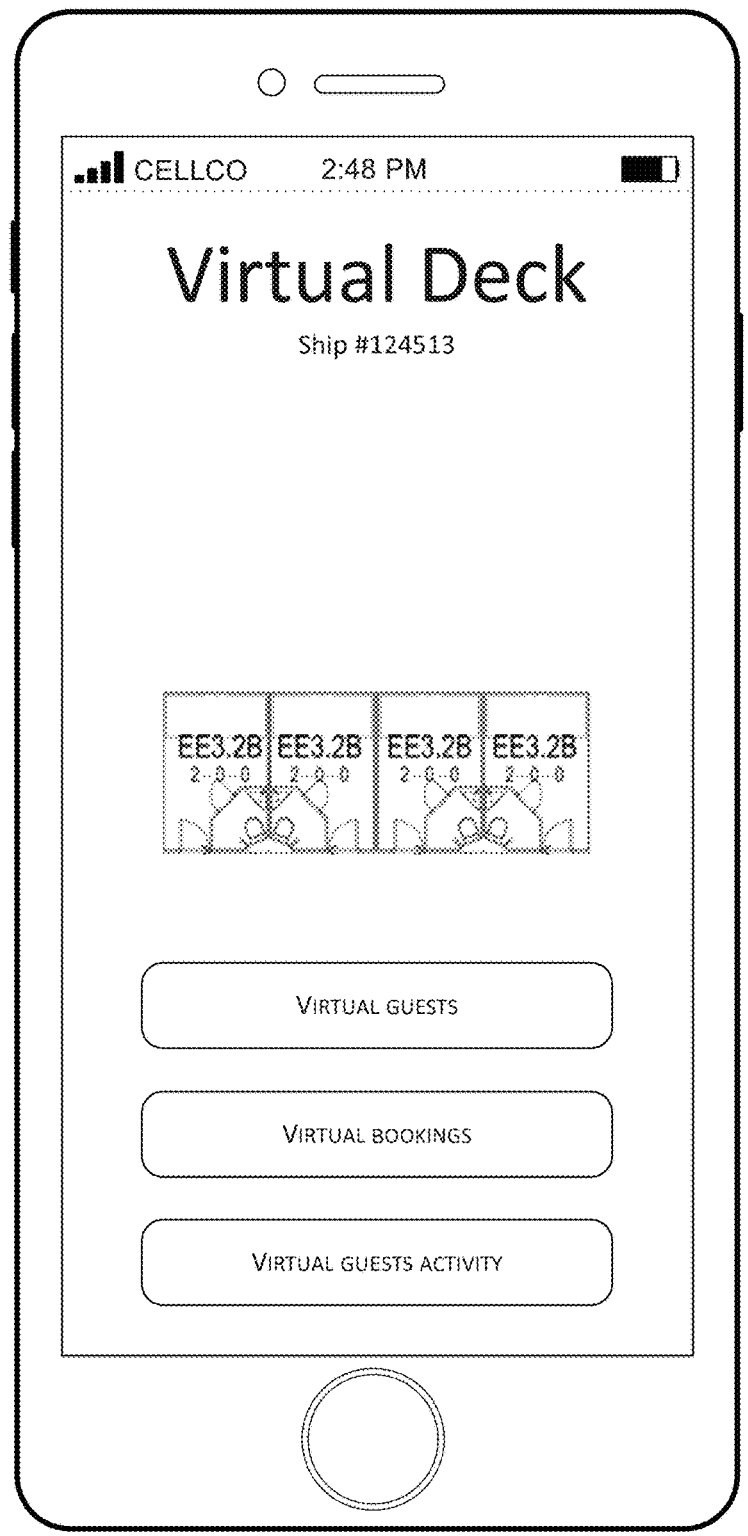
FIG. 3B illustrates an example user interface of an example arrangement of virtual cabins corresponding to a virtual deck of a cruise ship in accordance as described herein.

FIG. 3B illustrates another example of the application described herein. In the illustrated embodiment, an example illustration 300B of a virtual deck of a cruise ship is presented. The virtual deck may be presented to employees using the application via virtual passenger accounts. Thus, the employees may view the specific assigned virtual cabins on the virtual deck.

In some embodiments, the application may include selectable options associated with virtual passenger, virtual bookings, and/or virtual guest activity. Via these selectable options, an employee associated with a virtual passenger account may view identifying information associated with the virtual passengers. An employee associated with a virtual passenger account may also view any virtual bookings which have been made. Optionally, the application may present an indication of which virtual bookings were successful and which resulted in an error. An employee associated with a virtual passenger may also view other activities associated with the virtual passengers, such as product purchases and so on.

Example Flowcharts

Figure 4:
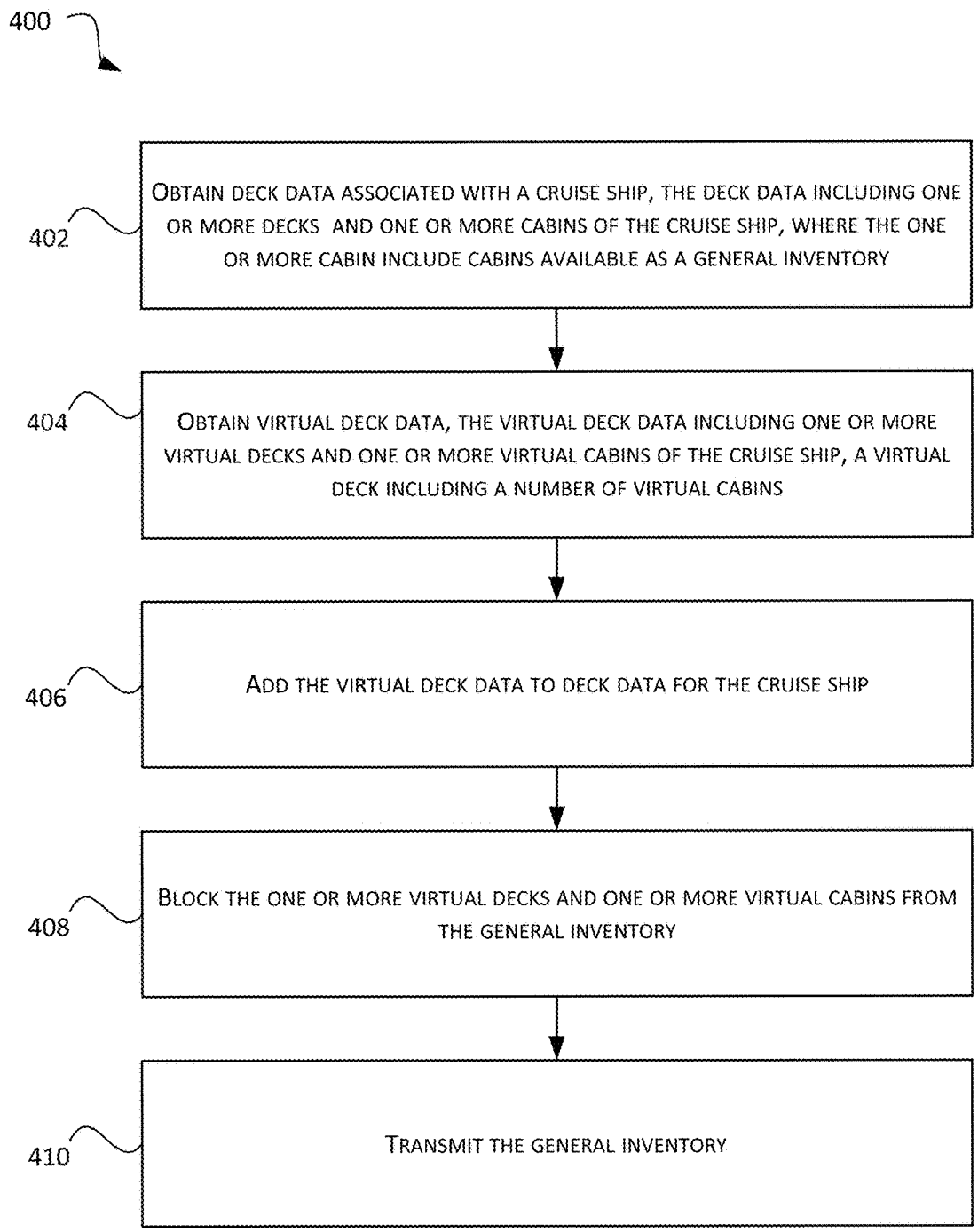
FIG. 4 illustrates an example process for accessing virtual deck data.

FIG. 4 illustrates an example process 400 for accessing virtual deck data. In some embodiments, the process 400 may be performed by a component of the system 100 such as the ship-based computing system 102 and/or shore-based computing system 104.

In block 402, the system may obtain real-world deck data associated with a particular cruise ship operated by the cruise operator in order to determine a physical configuration and general inventory of the particular ship. The deck data may include a logical representation of one or more decks of the cruise ship and one or more cabins of the decks. Each deck and each cabin may be associated respectively with a corresponding physical deck and a physical cabin of the ship. The cabins may correspond to a general inventory of the cruise ship, with the general inventory of the cruise ship including cabins or decks which are available for booking by passengers. The cabins may optionally not include a number of cabins associated with crew members, cabins associated with performers, or cabins otherwise unavailable to the general inventory.

In block 404, the system may obtain virtual deck data associated with the cruise ship in order to provide a virtual testing platform for virtual passengers of the ship. The virtual deck data may include one or more virtual decks and one or more virtual cabins which are assignable to virtual passengers.

In some embodiments, an employee of a cruise ship operator (e.g., an IT employee) may create the virtual deck data. For example, the employee can add additional decks or cabins to the cruise ship based on the deck data described in block 402. In this example, the employee may identify that certain virtual cabins and/or virtual decks are to be included. An example of virtual cabins on a virtual deck is illustrated in FIG. 3B.

For example, if the deck data indicates that a ship includes Deck #1, Deck #2, Deck #3, and Deck #4, each corresponding to a physical deck of the ship, the virtual deck data may indicate that a ship includes a virtual Deck #5 (corresponding to a simulated fifth deck that does not physically exist on the ship). The system may obtain virtual deck data prior to an initial embarkation of the cruise ship. In some embodiments, the system may periodically receive virtual deck data. For example, the system may receive virtual deck data after a threshold number of sailings (e.g., 1, 3, 5, and so on).

At block 406, the system may add the virtual deck data to the real-world deck data of the cruise ship in order to add the virtual decks and virtual cabins to the decks and cabins of the deck data. Each of the virtual decks and virtual cabins may optionally include a designation that the respective deck or cabin is associated with a virtual deck or cabin. For example, each of the virtual decks and virtual cabins may include an identifier indicating that the respective deck or cabin is virtual. For example, the deck data may include Deck #1, Deck #2, Deck #3, Deck #4, and Deck #5, where Deck #1, Deck #2, Deck #4, and Deck #5 correspond to physical decks of the cruise ship and Deck #3 corresponds to a virtual deck of the cruise ship. It will be understood that any number of decks of the deck data may correspond to virtual decks of the cruise ship. The system may add the virtual deck data to the deck data and store the deck data in one or more data stores. The one or more data stores may be accessed by the system prior to any sailing of the ship.

At block 408, the system blocks the one or more virtual decks and the one or more virtual cabins from being added to the general inventory of the cruise ship in order to prevent a virtual cabin from being made available to a guest. In order to assist in determining which decks and which cabins are associated with virtual decks and virtual cabins, each virtual cabin and each virtual deck may optionally include a respective flag or identifier indicating that the corresponding cabin or deck is a virtual cabin or virtual deck. For example, each deck and cabin may include respective properties including a virtual identifier where the virtual identifier indicates whether the deck or cabin is a virtual deck or virtual cabin. Optionally, the system may determine a virtual deck or virtual cabin based on a number of the deck or a number of a cabin exceeding a physical limit of the ship.

Furthermore, the system may recognize that each deck which includes one or more virtual cabins is a virtual deck. In some embodiments, the system may track or otherwise log the virtual cabins and virtual decks. For example, the system may store a table indicating the virtual deck data of the deck data and subsequently, the system may determine virtual decks and/or virtual cabins based on the table instead of the flags or identifiers associated with the virtual decks and/or virtual cabins.

In other embodiments, the system may otherwise identify virtual decks and/or virtual cabins based on when the deck or cabin was added to the deck data. For example, the system may determine that decks and/or cabins added at a first time are real-world decks and/or cabins, and decks and/or cabins added at a later time are virtual decks and/or cabins. In some embodiments, the system may subsequently receive data relating to additional virtual decks and/or virtual cabins, and the additional virtual decks and/or virtual cabins may be blocked from the general inventory by the system.

At block 410, the system transmits the general inventory associated with the ship. The general inventory, which may include the real-world cabins and virtual cabins, may be utilized for the virtual testing platform described herein. For example, virtual passengers may be assigned to virtual cabins for the ship. In this way, employees of the ship may utilize the virtual passengers to test functionality of the system described herein.

Figure 5:
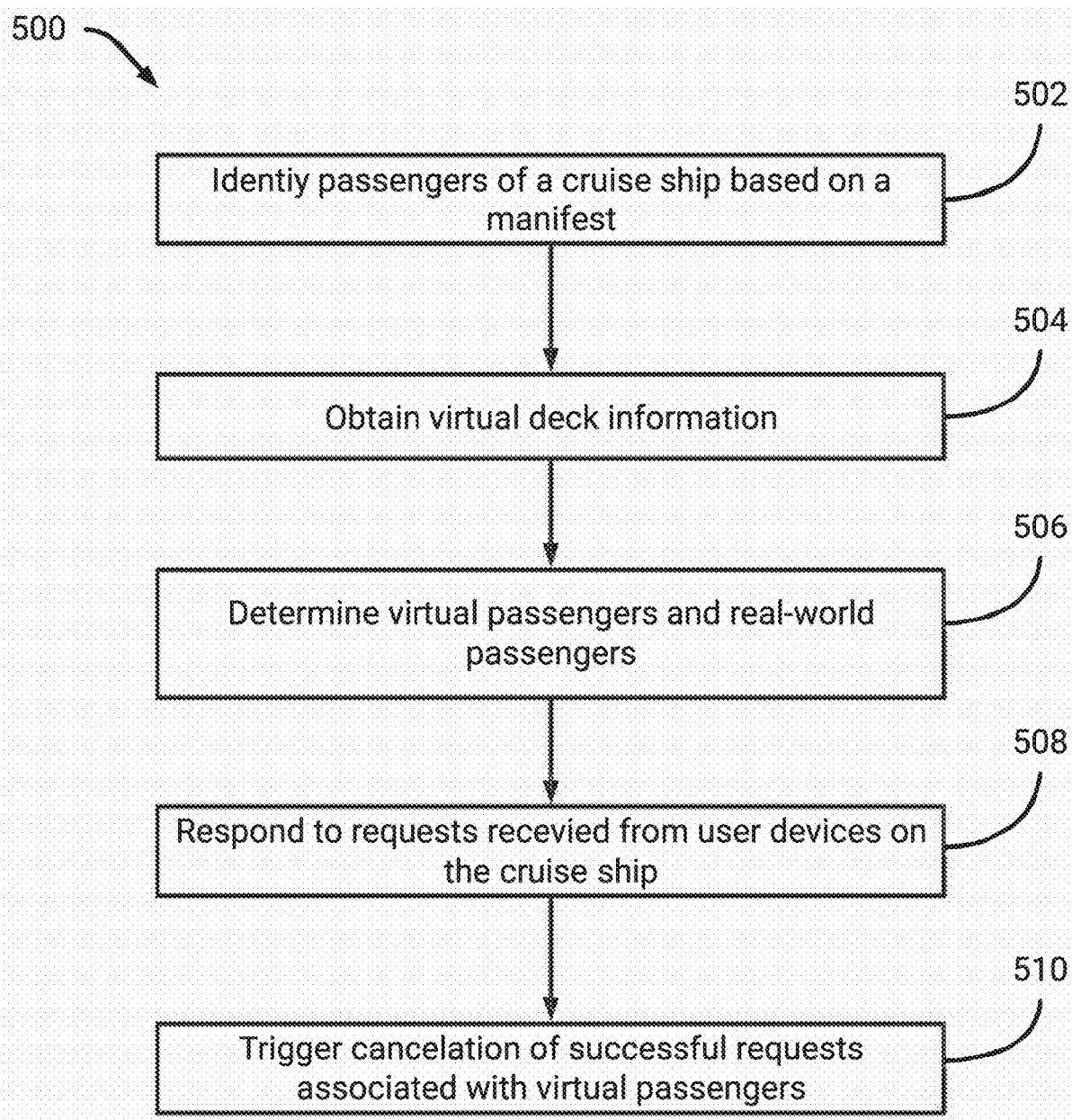
FIG. 5 illustrates an example process for a virtual testing service in accordance with aspects of this disclosure.

FIG. 5 illustrates an example process for a virtual testing service in accordance with aspects of this disclosure. The process 500 may be executed by a component of the system 100, such as the ship-based computing system 102.

At block 502, the system identifies passengers of a sailing of a cruise ship based on a manifest. As described above with respect to at least FIG. 1, passengers of the sailing of the cruise ship may be associated with booking information. The booking information may reflect that each passenger has booked a cabin on the sailing of the cruise ship and may include identifying information such as the passenger's name, a unique ID assigned to the passenger, or any other suitable identifying information.

In some embodiments, the system may access a manifest, or other list, which identifies the passengers booked on a sailing of the cruise ship. This manifest may indicate cabins and decks which are assigned to each of the passengers.

At block 504, the system obtains virtual deck information. As described above, the virtual deck information may indicate which cabins are virtual cabins on the cruise ship. For example, the cruise ship may have 5 real-world decks. In this example, the virtual deck information may indicate that all cabins which are on a sixth virtual deck are virtual cabins. As another example, the virtual deck information may indicate that identifiers of specific cabins correspond to virtual cabins. In this way, the system may determine that a subset of the cabins on the cruise ship are virtual cabins. The system may also determine that the remaining cabins are physical cabins (e.g., real-world cabins).

At block 506, the system determines virtual passengers and real-world passengers. The system may identify that all passengers indicated in the manifest, or other list, who are assigned to virtual cabins represent virtual passengers. Optionally, the system may have information identifying names of the virtual passengers. Thus, the system may identify particular passengers as being virtual passengers.

The virtual passengers which are determined by the system may be marked in the manifest, or other list, as having not arrived to the ship to embark on the sailing. Thus, when a governmental entity reviews the manifest, the entity will note that these virtual passengers are not present.

At block 508, the system responds to requests received from user devices on the cruise ship. The real-world passengers, and employees using accounts associated with the virtual passengers, may utilize an application to request bookings or purchase products. For example, a real-world passenger may request a reservation for a table at a particular dining establishment. As another example, a virtual passenger may use the application to request a booking on a particular excursion. In this example, an employee may provide log-in information associated with the virtual passenger.

The requests received from the user devices may be routed to one or more computing systems utilized to effectuate the requests. For example, the cruise ship may have one or more computing systems associated with processing product purchases. As another example, the cruise ship may have other computing systems, point of sale systems, and so on, which are associated with reservations.

At block 510, the system triggers cancelation of successful requests associated with virtual passengers. Requests made by virtual passengers may optionally be treated the same as requests from real-world passengers. Indeed, employees who are using accounts associated with the virtual passengers may be utilizing a same, or substantially similar, application.

Successful requests may be maintained by the computing systems of the cruise ship, for example in one or more data stores. As an example, computing systems associated with a restaurant may maintain up-coming reservations. Additionally, certain requests may be maintained by the system in one or more central databases. For example, reservations for excursions may be stored in a central database accessible to computing systems used by employees who implement the excursions. Optionally, certain requests (e.g., purchase requests) may be similarly stored in one or more central databases. These requests may indicate that a passenger prefers to purchase a product, such as food, an item or souvenir, and so on.

Since these requests may consume limited resources of the cruise ship, such as a defined number of tables in a dining establishment, the system may determine which of the successful requests correspond to virtual passengers. As an example, the system may identify a virtual passenger based on the associated name. In this example, virtual passengers may have known names or follow a template or format known to the system. As an example, virtual passengers may have names which start with "Virtual." In some embodiments, the virtual passenger accounts or virtual passenger account data may be designated by an identifier indicating that the corresponding user is a virtual passenger. For example, a first virtual passenger may correspond to the user ID VG0102910 and a first real-world passenger may correspond to the user ID G1024210 where the inclusion of the "V" is an indication of the virtual passenger.

The system may also determine that a request is associated with a virtual passenger based on a cabin or deck assigned to the requesting passenger. For example, if a request is associated with a passenger assigned to a virtual cabin or virtual deck, then the system may identify the request as being associated with a virtual passenger.

The system may then trigger cancellation of successful requests from virtual passengers. For example, certain requests may be canceled by the system in substantially real-time. In this example, requests for purchases may be canceled in substantially real-time. As an example, the system may determine that credit card information associated with the virtual passengers is invalid. As another example, the credit card information may correspond to a specific credit card utilized by a cruise ship operator. Thus, the purchase may be canceled due to invalidity of the credit card information or based on identifying a specific credit card. In implementations in which payment is processed at the end of a sailing, the system may cancel product purchase requests which are associated with virtual passengers at that time.

Certain requests may additionally be canceled periodically. For example, a request to reserve a table in a dining establishment may be maintained by a computing system associated with the dining establishment. In this example, the computing system may indicate whether the reservation by a virtual passenger was successful. For a successful reservation, the system may then provide a cancelation request to the computing system to cancel the successful reservation. In some embodiments, the computing system may provide a batch of cancelation requests associated with virtual passengers. As an example, the computing system may aggregate cancelation requests periodically (e.g., at a threshold frequency). These aggregated cancelation requests may then be processed. For example, periodically (e.g., at a threshold frequency) the system may provide cancelation requests to respective computing systems.

Figure 6:
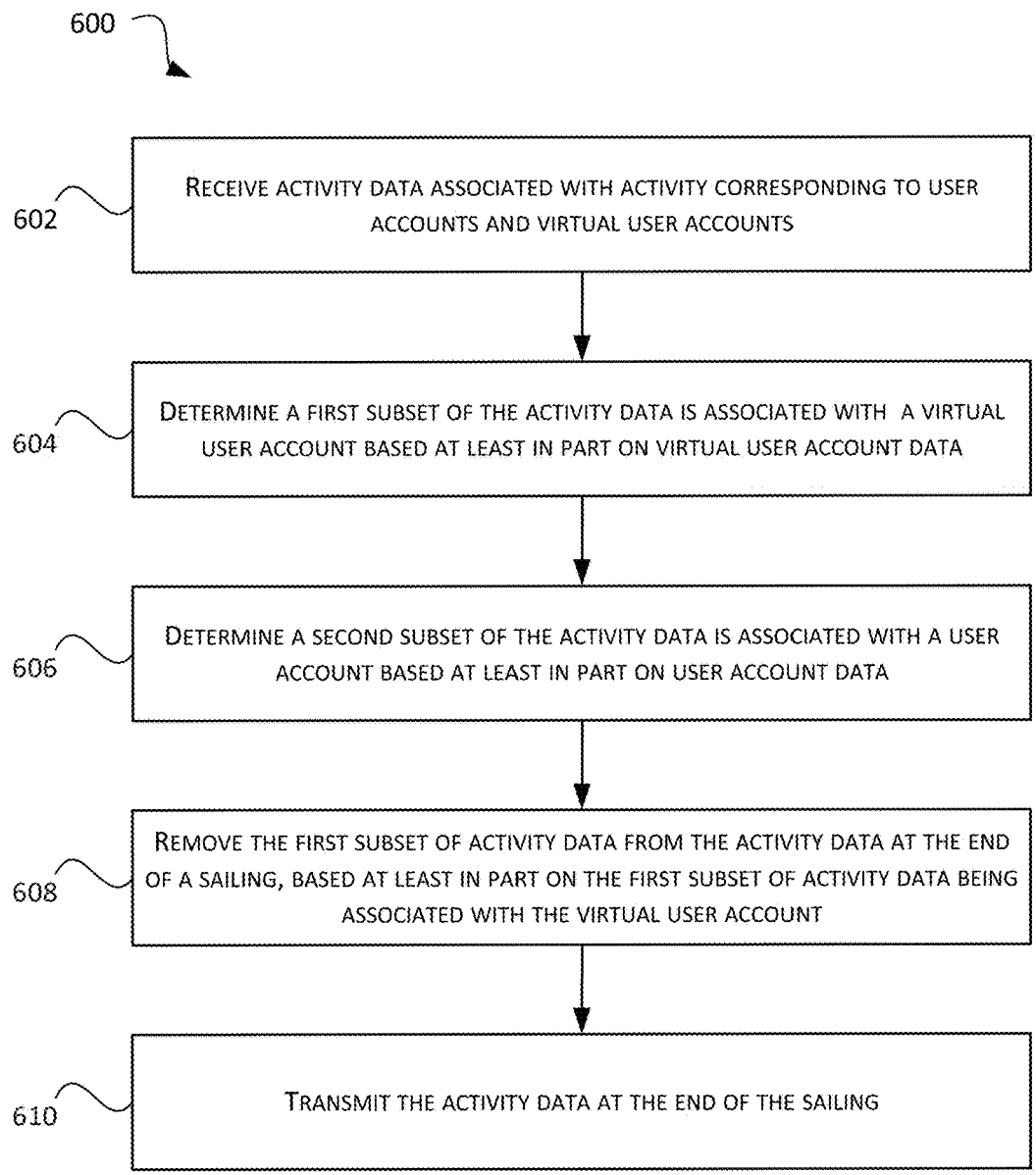
FIG. 6 illustrates another example process for a virtual testing service in accordance with aspects of this disclosure.

FIG. 6 illustrates another example process for a virtual testing service in accordance with aspects of this disclosure. The process 600 may be performed by the system 100, such as the ship-based computing system 102.

At block 602, the ship-based computing system 102 receives activity data associated with activity of one or more virtual passengers (e.g., accounts associated with the virtual passengers) and one or more real-world passengers. The activity data may reflect one or more purchases, reservations, or other activity associated with the real-world passenger accounts and/or the virtual passenger accounts. For example, the activity data may include a purchase of a real-world excursion, a real-world reservation of an experience, a real-world dining reservation, and so on.

At block 604, the ship-based computing system 102 determines that a first subset of the activity data is associated with a virtual passenger. The determination that the first subset of activity data is associated with a virtual passenger account may be based at least in part on virtual passenger account data. For example, the determination may be based on a virtual passenger account identifier associated with the first subset of activity data. The ship-based computing system 102 may parse the virtual passenger account data for an identifier or indicator that the virtual passenger account data is associated with a virtual passenger account. For example, the virtual passenger account data may include a field-value pair, such as a field "virtual" and a value "1" where the "1" indicates that the virtual passenger account data is associated with a virtual passenger account.

The first subset of the activity data may correspond to activities by the virtual passenger account for testing purposes. For example, the first subset of activity data may correspond to real-world purchases, reservations, or other activity of the virtual passenger account in order to test the response of the corresponding system. For further example, the first subset of activity data may include a real-world reservation by a virtual passenger account of a real-world dining experience in order to test whether a real-world passenger account can reserve the same or similar dining experience, and if not, to determine why not. In some embodiments, the first subset of activity data may include activity data associated with a plurality of virtual passenger accounts. For example, the first subset of activity data may be associated with each virtual passenger account corresponding to a sailing of the cruise ship.

At block 606, the ship-based computing system 102 determines that a second subset of activity data is associated with a real-world passenger based at least in part on real-world passenger account data. The ship-based computing system 102 may parse the real-world passenger account data for an identifier or indicator indicating that the real-world passenger account data is associated with a real-world passenger account. For example, the account data may include a field-value pair, such as a field "virtual" and a value "0" where the "0" indicates that the account data is associated with a real-world passenger. Furthermore, in some embodiments, the ship-based computing system 102 may determine that the real-world passenger account data is associated with a real-world passenger account based on a lack of a given field value pair.

At block 608, the ship-based computing system 102 removes the first subset of activity data from the activity data in order to remove activity data associated with one or more virtual passenger accounts. The ship-based computing system 102 may remove the first subset of activity data at the end of a sailing. In some embodiments, the ship-based computing system 102 may periodically remove the first subset of activity data (e.g., every minute, every hour, every day, every week). The ship-based computing system 102 may further remove any activity data associated with a virtual passenger account from the plurality of activity data. In removing the first subset of activity data from the activity data, the ship-based computing system 102 may delete or otherwise modify the first subset of activity data. In some embodiments, the ship-based computing system 102 may remove the first subset of activity data from the activity data and store the first subset of activity data in a data store associated with the ship-based computing system 102.

At block step 610, the ship-based computing system 102 transmits the activity data at the end of a sailing for further data processing or collection. The ship-based computing system 102 may transmit the activity data to one or more computing systems (e.g., the shore-based computing system 104).

Figure 7:
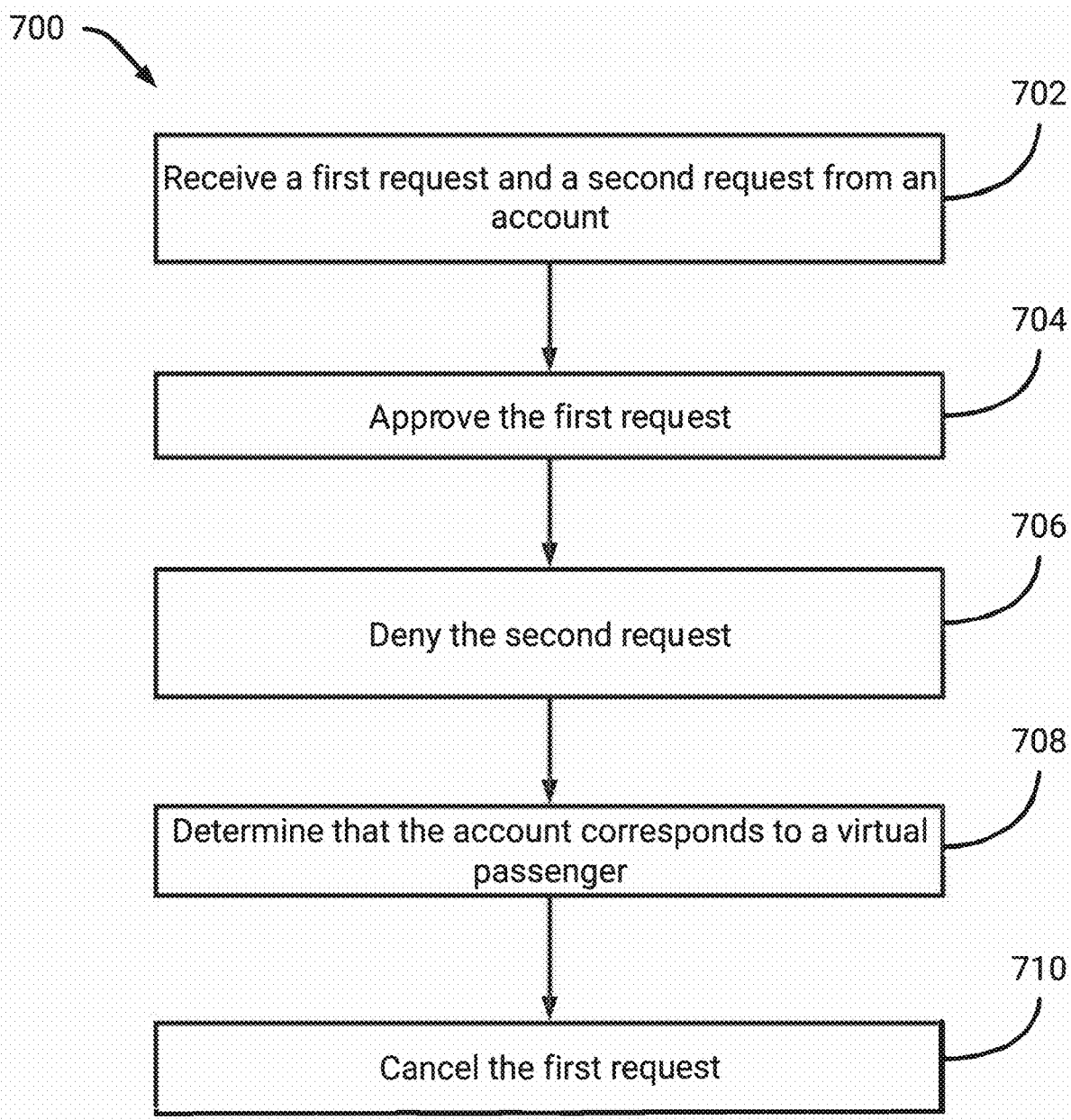
FIG. 7 illustrates an example process for canceling a request received from a virtual passenger.

FIG. 7 illustrates an example process 700 for canceling a request received from a virtual passenger. The process 700 may be performed by the system 100, such as the ship-based computing system 102.

At block step 702, the ship-based computing system 102 receives a first request and a second request from an account where the requests correspond to real-world activities. Example activities may include requests for bookings, purchases of products, and so on.

At block 704, the ship-based computing system 102 approves the first request. The approval of the first request may correspond to approving one or more reservations or purchases. Prior to the approval, the ship-based computing system 102 may be configured to monitor a number of available reservations, available slots, or otherwise monitor the availability of a given service. Such activity information may be stored and updated as a part of activity data of the ship-based computing system 102.

The approval of the first request may be conditioned on the activity data illustrating that the corresponding activities having sufficient availability. For example, if an activity such as an excursion has been fully booked, the ship-based computing system 102 may reject a request related to the activity due to the activity being unavailable. Upon approval of the first request, the activity data of the ship-based computing system 102 may be affected. For example, activity data of the ship-based computing system 102 may be modified to show that the first request has been approved with respect to the given activity. Furthermore, the modifications to the activity data may affect a number of available reservations, available slots, or otherwise affect the availability of a given service. For example, due to the approval of the first request, a certain activity may no longer be available for reservation and/or purchasing. Additionally, account data associated with the account may be updated to reflect that an activity has been approved for the respective account. For example, account data associated with the account may be updated to show that the first request was approved.

At block 706, the ship-based computing system 706 denies the second request. The second request may be denied due to improper functioning of the reservation system. Denial of the second request may include receiving information indicating that the request could not be completed. Denial of the second request may also include the passage of a threshold amount of time without receipt of a response indicating successful completion of the second request. For example, the second request may relate to a booking for a table at a dining establishment. Computing systems associated with the dining establishment may fail to provide a response to the second request.

Similar to block 704, the activity data may be updated to reflect this error. Optionally, a bug report or ticket (e.g., JIRA ticket) may be created to address the error. In some embodiments, log data may be captured to describe the error. For example, log data may be obtained from all systems implicated in the routing of the second request to a final destination (e.g., computing systems associated with the dining establishment). The log data which forms processing of the second request may then be associated with the activity data.

At block 708, the ship-based computing system 102 determines that the account corresponds to a virtual passenger. As described above, the ship-based computing system 102 may parse the account data of the first account for one or more flags, identifiers, headers, and so on, indicating the user status (e.g., a virtual passenger or a real-world passenger) of the account. Although block 708 is described as occurring after blocks 702-706, it will be understood that embodiments of the ship-based computing system 102 can determine that the account corresponds to a virtual passenger during any block of the process 700.

At block 710, the ship-based computing system 102 cancels the approved first request. The ship-based computing system 102 may remove the approved request from the activity data of the ship-based computing system 102. For example, the ship-based computing system 102 may modify the activity data such that a number of available reservations, available slots, or otherwise affected by the approved request are restored to previous numbers. As another example, the system 102 may provide a cancelation request to a destination associated with the first request.

Figure 8:
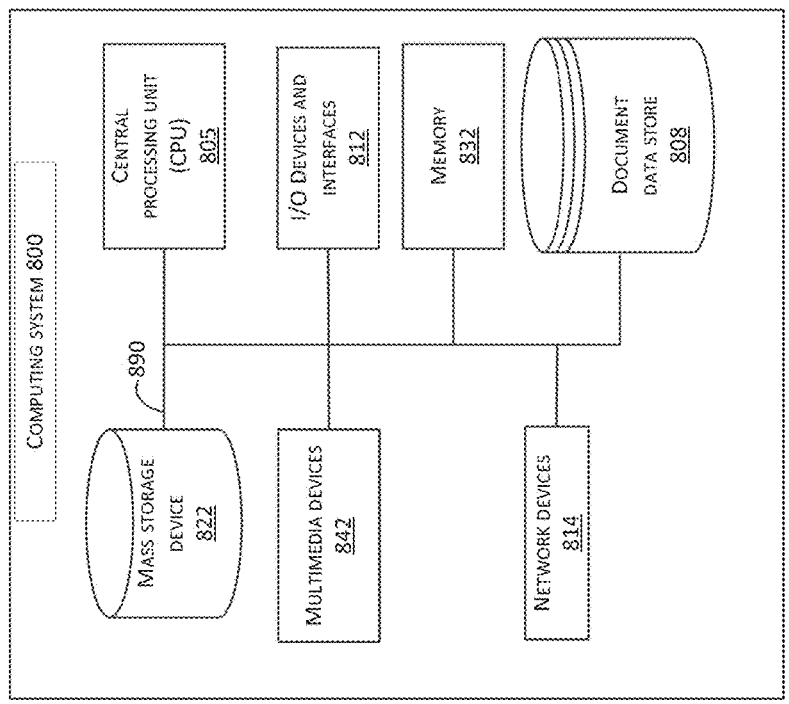
FIG. 8 is a block diagram of exemplary components of a computing system participating in the networked computing system of FIG. 1.

FIG. 8 illustrates a block diagram of exemplary components of a computing system 800 participating in the networked computing system 100 of FIG. 1, according to an exemplary embodiment. The computing system 800 may be utilized by or with, for example, one or more of the real-world passenger computing devices 106A, one or more of the virtual passenger computing devices 106B, the ship-based computing system 102, or the shore-based computing system 104. The computing devices and systems include, for example, a computing device or system that is IBM, Macintosh, or Linux/Unix compatible or a terminal or workstation. In one embodiment, the computing system 800 includes one or more central processing units ("CPUs") 805, which may each include a conventional or proprietary microprocessor. In some embodiments, the CPU 805 may perform various computations, associations, and so on, of data stored in a data store. Accordingly, the CPU 805 may enable the computing system 800 to process information in a data store and generate information for transmission to and between other devices. The computing system 800 further includes one or more memory 832, such as random access memory ("RAM") for temporary storage of information, one or more read only memory ("ROM") for permanent storage of information, and one or more mass storage device 822, such as a hard drive, diskette, solid state drive, or optical media storage device. Typically, the components of the computing system 800 are connected to the computer using a standard based bus system 890. In different embodiments, the standard based bus system 890 could be implemented in Peripheral Component Interconnect ("PCI"), Microchannel, Small Computer System Interface ("SCSI"), Industrial Standard Architecture ("ISA"), Extended ISA ("EISA"), and networked architectures, for example. In addition, the functionality provided for in the components and modules of computing system 800 may be combined into fewer components and modules or further separated into additional components and modules than as shown in FIG. 8.

The computing system 800 is generally controlled and coordinated by operating system software, such as Windows XP, Windows Vista, Windows 7, Windows 8, Windows Server, Unix, Linux, SunOS, Solaris, iOS, Blackberry OS, or other compatible operating systems. In Macintosh systems, the operating system may be any available operating system, such as MAC OS X. In other embodiments, the computing system 800 may be controlled by a proprietary operating system. Conventional operating systems control and schedule computer processes for execution, perform memory management, provide file system, networking, I/O services, and provide a user interface, such as a graphical user interface ("GUI"), among other things.

The exemplary computing system 800 may include one or more commonly available input/output (I/O) devices and interfaces 812, such as a keyboard, mouse, touchpad, and printer. In one embodiment, the I/O devices and interfaces 812 include one or more display devices, such as a monitor, that allows the visual presentation of data to a user. More particularly, a display device provides for the presentation of the user interface or GUI, application software data, and multimedia presentations, for example. The computing system 800 may also include one or more multimedia devices 842, such as speakers, video cards, graphics accelerators, and microphones, for example.

In the embodiment of FIG. 8, the I/O devices and interfaces 812 provide a communication interface to various external devices. In the embodiment of FIG. 8, the computing system 800 is electronically coupled to one or more networks, which comprise one or more of a LAN, WAN, and/or the Internet, for example, via a wired, wireless, or combination of wired and wireless, communication link via one or more networking devices 814. For example, in the non-limiting embodiment of the present example, the computing system 800 is electronically coupled to the cloud 110 of FIG. 1 via a wired or wireless connection using the networking devices 814. Other implementations are possible. Using the networking devices 814, the computing system 800 may communicate over networks with various computing devices and/or other electronic devices via wired or wireless communication links. In some embodiments, the networking devices 814 allow one computing system (for example, the ship-based computing system 102) to communicate with another computing system (for example, the shore-based computing system 104). Additionally, or alternatively, the networking devices 814 may allow the computing systems 102 and/or 104 to communicate with the real-world passenger computing devices 106A and/or the virtual passenger computing devices 106B. Via such communications, the real-world passenger and the virtual passengers may schedule activities, and so on, to participate in while on the cruise. In some embodiments, the networking devices 814 determine whether the network or connection between the ship-based computing system 102 and the shore-based computing system 104 is in one of a connected state, indicative of enabled communications between the computing systems, and a disconnected state, indicative of disabled communications between the computing systems.

In some embodiments, the I/O devices and interfaces 812 may generate or provide the user interface (UI). The UI may allow real-world passengers 105A to browse for activities to participate in while on the cruise and to view recommended activities. The UI may further allow for virtual passengers 105B to implementing testing services concerning the capabilities of the UI. In some embodiments, the UI allows the passengers to update customer information, for example profile information, profile preferences, interests, and so forth. In some embodiments, the UI allows for operators of the ship-based computing system 102 or the shore-based computing system 104 to monitor operation of the respective computing system and adjust the operation of the respective computing system. Operators of the ship-based computing system or the shore-based computing system 104 may be able to adjust operation of the respective computing system based on the results of the virtual testing platform of the present disclosure.

In implementations of the present disclosure, information is provided to the computing system 800 over the network 110 of FIG. 1 from one or more of the computing systems 102 and 104, the real-world passenger computing devices 106A, and the virtual passenger computing devices 106B. In some embodiments, a networked data storage (for example, data storage 108 illustrated in FIG. 1) stores data for the various computing systems 102 and 104, the real-world-passenger computing devices 106A, and the virtual passenger computing devices 106B. In some instances, one or more pieces of information specific to each customer is stored in the networked data storage. Such forms of information can include, but are not limited to information from a customer profile associated with each customer, corresponding travel information for each customer, historical product information for each customer, information gleaned from social media platforms, and/or feedback information for previously-experienced or purchased products. The networked data storage may be communicatively coupled to one or more internal and/or external data sources that store and/or provide data corresponding to the various forms of information described above. In some embodiments, data from the networked data storage can also be stored in a document data store 808 or similar data store in the computing system 800. The data in the document data store 808 may be stored in a graph database or graph structure. In some embodiments, data is stored in the document data store 808 using other relational database formats, such as but not limited to Sybase, Oracle, CouchBase and Microsoft® SQL Server as well as other types of databases such as, for example, a flat file database, an entity-relationship database, and object-oriented database, and/or a record-based database.

Embodiments of the computing system 800 include various modules that will be described with reference to non-limiting examples. It will be understood that implementations of the virtual testing services and systems described herein are not limited to computing systems that only include these exemplary modules. In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, or any other tangible medium. Such software code may be stored, partially or fully, on a memory device of the executing computing device, such as the real-world passenger computing devices 106A or the virtual passenger computing devices 106B or one of the ship-based computing system 102 or the shore-based computing system 104, for execution by the computing system 800. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware, or a combination thereof. Generally, the modules described herein refer to logical modules that may be combined with other modules or divided into sub-modules despite their physical organization or storage.

It will be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements, and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," "involving," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y or Z," unless specifically stated otherwise, is otherwise understood with the context as used in general to present that an item, term, and so on, may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to illustrative embodiments, it will be understood that various omissions, substitutions, and changes in the form and details of the devices or algorithms illustrated can be made without departing from the spirit of the disclosure. As will be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A method for validating functionality of one or more ship-based systems managing operations associated with a cruise ship, the one or more ship-based systems being in communication with a plurality of user devices executing respective applications, the applications being controlled by passengers of the cruise ship and including functionality which enables triggering of real-time requests to the ship-based systems, the method comprising:

by one or more processors,
identifying, via an obtained manifest, passengers of a sailing of the cruise ship, the manifest indicating assignments of the passengers to respective cabins of the cruise ship,
wherein creation of individual user accounts associated with the application triggers addition of individual new profiles associated with respective passengers in the manifest, and wherein to create a particular user account, the application is configured to cause validation of, at least, an associated passenger being assigned to a particular cabin of the cruise ship;
obtaining virtual deck information indicating that a first subset of the cabins represents virtual cabins of the cruise ship which are not physically present on the cruise ship, wherein a second subset of the cabins represents physical cabins of the cruise ship;
determining, for the identified passengers, a first subset of the passengers who represent virtual passengers and a second subset of the passengers who represent real-world passengers, wherein the determination is based on one or more flags or indicia associated with virtual passengers,
wherein the virtual passengers are associated with user accounts utilized for testing of the application, and wherein the virtual passengers are indicated in the manifest as not having arrived to board the cruise ship, such that the virtual passengers are not counted as being embarked on the cruise ship; and
responding to requests for bookings received from applications executed by the plurality of user devices, wherein responses to the requests indicate whether the bookings were successful, wherein each request is determined as being associated with a virtual passenger or a real-world passenger, wherein requests associated with virtual passengers are configured to perform real-time testing of functionality of the application,
wherein a successful booking associated with a virtual passenger is triggered for cancellation,
wherein for an unsuccessful booking associated with a virtual passenger, log data is stored for subsequent review, and wherein the log data includes information from one or more of the ship-based systems associated with processing the unsuccessful booking.

2. The method of claim 1, wherein determining the first subset of the passengers who represent virtual passengers is based at least in part on a flag or indicia comprising an identifier associated with each passenger.

3. The method of claim 2, wherein the identifier is a template of a name assigned to virtual passengers that indicates a passenger is a virtual passenger or an indication that a virtual cabin has been assigned to a passenger.

4. The method of claim 1, wherein a request for a booking is routed to a particular computing system, and wherein the request is canceled based on transmitting information to the particular computing system indicating cancellation of the request.

5. The method of claim 1, wherein the bookings correspond to bookings of services offered on the cruise ship or requests for purchases of products.

6. The method of claim 1, further comprising:
aggregating one or more portions of the bookings which correspond to bookings with limited availability; and
periodically removing the aggregated portions of the activities.

7. The method of claim 1, wherein a first request of the received requests is determined to correspond to a virtual passenger, and wherein the determination is based on a name associated with the first request or a cabin which is associated with the first request.

8. The method of claim 1, wherein at least one of the ship-based systems executes a software agent configured to use a particular user account associated with a particular virtual passenger, and wherein the software agent periodically provides requests to test the application.

9. A system comprising one or more processors and non-transitory computer storage media storing instructions that when executed by the one or more processors, cause the processors to perform operations comprising:

identifying, via an obtained manifest, passengers of a sailing of a cruise ship, the manifest indicating assignment of the passengers to respective cabins of the cruise ship, wherein a mobile application is configured for use on the cruise ship, the mobile application being configured for execution by user devices of passengers on the cruise ship, the user devices being in communication with one or more ship-based systems via the mobile application, and the mobile application including functionality which enables triggering of real-time requests to the ship-based systems;

obtaining virtual deck information indicating that a first subset of the cabins represents virtual cabins of the cruise ship which are not physically present on the cruise ship, wherein a second subset of the cabins represents physical cabins of the cruise ship;

determining, for the identified passengers, a first subset of the passengers who represent virtual passengers and a second subset of the passengers who represent real-world passengers, wherein the determination is based on one or more flags or indicia associated with virtual passengers, wherein the virtual passengers are associated with user accounts utilized for testing of the mobile application, and wherein the virtual passengers are indicated in the manifest as not having arrived to board the cruise ship, such that the virtual passengers are not counted as being embarked on the cruise ship; and responding to requests for activities received from mobile applications executed by a plurality of user devices, wherein responses to the requests indicate whether the bookings were successful, wherein each request is determined as being associated with a virtual passenger or a real-world passenger, wherein requests associated with virtual passengers are configured to perform real-time testing of functionality of the mobile application, wherein a successful booking associated with a virtual passenger is triggered for cancellation, wherein for an unsuccessful booking associated with a virtual passenger, log data is stored for subsequent review, and wherein the log data includes information from one or more of the ship-based systems associated with processing the unsuccessful booking.

10. The system of claim 9, wherein determining the first subset of the passengers is based at least in part on a flag or indicia comprising an identifier associated with each passenger.

11. The system of claim 10, wherein the identifier is a template of a name assigned to virtual passengers.

12. The system of claim 9, wherein determining the first subset of the passengers is based at least in part on respective cabins assigned to the passengers.

13. The system of claim 12, wherein each of the first subset of the passengers is assigned to a virtual cabin of the cruise ship.

14. The system of claim 9, wherein the activities correspond to requests for bookings or requests for purchases of products.

15. The system of claim 9, wherein a first request of the received requests is determined to correspond to a virtual passenger, and wherein the determination is based on a name associated with the first request or a cabin which is associated with the first request.

16. The system of claim 9, wherein a first subset of the successful bookings associated with the virtual passengers are canceled periodically, and wherein a second subset of the successful bookings associated with the virtual passengers are canceled a threshold amount of time prior to completion of the sailing of the cruise ship.

17. Non-transitory computer storage media storing instructions that when executed by a system of one or more processors, cause the one or more processors to perform operations comprising:

identifying, via an obtained manifest, passengers of a sailing of a cruise ship, the manifest indicating assignment of the passengers to respective cabins of the cruise ship, wherein an application is configured for use on the cruise ship, the application being configured for execution by user devices of passengers on the cruise ship, the user devices being in communication with one or more ship-based systems via the application, and the application including functionality which enables triggering of real-time requests to the ship-based systems;

obtaining virtual deck information indicating that a first subset of the cabins represent virtual cabins of the cruise ship which are not physically present on the cruise ship, wherein a second subset of the cabins represent physical cabins of the cruise ship;

determining, for the identified passengers, a first subset of the passengers who represent virtual passengers and a second subset of the passengers who represent real-world passengers, wherein the determination is based on one or more flags or indicia associated with virtual passengers, wherein the virtual passengers are associated with user accounts utilized for testing of the application, and wherein the virtual passengers are indicated in the manifest as not having arrived to board the cruise ship, such that the virtual passengers are not counted as being embarked on the cruise ship; and responding to requests for activities received from applications executed by a plurality of user devices, wherein responses to the requests indicate whether the bookings were successful, wherein each request is determined as being associated with a virtual passenger or a real-world passenger, wherein requests associated with virtual passengers are configured to perform real-time testing of functionality of the application, wherein a successful booking associated with a virtual passenger is triggered for cancellation, wherein for an unsuccessful booking associated with a virtual passenger, log data is stored for subsequent review, and wherein the log data includes information from one or more of the ship-based systems associated with processing the unsuccessful booking.

18. The computer storage media of claim 17, wherein determining the first subset of the passengers is based at least in part on a flag or indicia comprising an identifier associated with each passenger.

19. The computer storage media of claim 18, wherein the identifier is a template of a name assigned to virtual passengers that indicates a passenger is a virtual passenger or an indication that a virtual cabin has been assigned to a passenger.

20. The computer storage media of claim 17, wherein the activities correspond to requests for bookings or requests for purchases of products.

21. The computer storage media of claim 20, wherein a first subset of the successful bookings associated with the virtual passengers are canceled periodically, and wherein a second subset of the successful bookings associated with the virtual passengers are canceled a threshold amount of time prior to completion of the sailing of the cruise ship.

\* \* \* \* \*